US006555642B2

(12) United States Patent
Malinge et al.

(10) Patent No.: US 6,555,642 B2
(45) Date of Patent: Apr. 29, 2003

(54) OLEFIN POLYMER OR COPOLYMER FORMED USING A SOLID CATALYTIC COMPONENT

(75) Inventors: Jean Malinge, Loubieng (FR); Claude Brun, Idron (FR); Jean-Loup Lacombe, Artiguelouve (FR)

(73) Assignee: Elf Atochem, S.A., Puteaux (FR)

( * ) Notice: Subject to any disclaimer, the term of this patent is extended or adjusted under 35 U.S.C. 154(b) by 0 days.

(21) Appl. No.: 10/066,626

(22) Filed: Feb. 6, 2002

(65) Prior Publication Data

US 2002/0147284 A1 Oct. 10, 2002

Related U.S. Application Data

(62) Division of application No. 09/505,968, filed on Feb. 17, 2000, now Pat. No. 6,433,108, which is a continuation of application No. 08/831,945, filed on Apr. 2, 1997, now abandoned.

(30) Foreign Application Priority Data

Apr. 2, 1996 (FR) .............................. 96.04109

(51) Int. Cl.$^7$ .............................. C08F 210/16
(52) U.S. Cl. .................. 526/348; 526/348.5; 526/348.6
(58) Field of Search .............................. 526/348, 348.5, 526/348.6

(56) References Cited

U.S. PATENT DOCUMENTS

| 4,481,301 A | 11/1984 | Nowlin et al. |
| 4,536,484 A | 8/1985 | Lacombe et al. |
| 5,112,785 A | 5/1992 | Brun et al. |
| 5,244,854 A | 9/1993 | Noristi et al. |

FOREIGN PATENT DOCUMENTS

| CA | 1 248 511 | | 1/1989 |
| CA | 1 288 758 | | 9/1991 |
| EP | 0 014 523 A1 | | 1/1980 |
| EP | 0 032 308 A2 | | 7/1981 |
| EP | 0 239 475 A1 | | 3/1987 |
| EP | 0 264 169 A1 | | 6/1987 |
| EP | 0 296 021 B1 | | 12/1988 |
| EP | 529978 A1 | * | 3/1993 |
| EP | 0 619 325 A1 | | 4/1993 |
| EP | 619325 A1 | * | 10/1994 |
| EP | 0 744 416 A1 | | 5/1996 |
| EP | 744416 A1 | * | 11/1996 |
| JP | 8-302083 | | 11/1996 |

OTHER PUBLICATIONS

M.P. McDanial, Journal of Catalysis, vol. 67, No. 1, Jan., 1981, pp. 72–76.

* cited by examiner

Primary Examiner—David W. Wu
Assistant Examiner—R. Rabago
(74) Attorney, Agent, or Firm—Smith, Gambrell & Russell, LLP

(57) ABSTRACT

A copolymer of ethylene and an alpha-olefin contains from 3 to 12 carbon atoms, wherein 0.1 to 1.5 mol % of the units originate from the alpha-olefin. The copolymer has a relative density ranging from 0.960 to 0.940, a transition metal content lower than 6 ppm, an Mw/Mn ratio higher than 7, an Mz/Mw ratio higher than 3.3 and an Mz higher than 300,000. The copolymer is prepared from the polymerization or co-polymerization of at least one olefin in the presence of a solid catalytic component or a prepolymerized catalyst.

3 Claims, No Drawings

OLEFIN POLYMER OR COPOLYMER FORMED USING A SOLID CATALYTIC COMPONENT

This application is a division of Ser. No. 09/505,968 filed Feb. 17, 2000, now U.S. Pat. No. 6,433,108, which is being a continuation of Ser. No. 08/831,945 filed Apr. 2, 1997 (abandoned), both applications being incorporated herein, in their entirety, by reference.

The invention relates to a process for the manufacture of a solid catalytic component for the polymerization or copolymerization of olefins, resulting in a polymer or copolymer with broadened molecular mass distribution.

Some plastics conversion processes require the development of thermoplastic resins with broadened molecular mass distribution, including a high mass component and a low mass component at the same time. The high mass component gives the material consistency during its conversion. In blow-extrusion this component prevents the resin from flowing too rapidly, and this allows the resin to be better laid flat on the walls of the mould during the blowing to form a hollow body.

In addition, this high mass component gives the final material better mechanical properties like impact strength, stress cracking resistance and tensile strength.

The low mass component acts as a lubricant, and this makes the conversion of the resin easier.

A polymer or copolymer has a broadened molecular mass distribution if it has, at the same time, a high Mw/Mn, a high Mz/Mw and a high Mz, Mw denoting its weight-average molecular mass, Mn denoting its number-average molecular mass, and Mz denoting its z-average molecular mass. The ratio Mw/Mn is more representative of the broadening towards the low masses, whereas Mz/Mw and Mz are more representative of the broadening towards the high masses.

The production of catalysts producing such resins, and with high output efficiencies, is particularly difficult. A set of reactors in cascade is generally used, these having different polymerization conditions and each producing a specific population of molecular masses. Polymers or copolymers which have a broader molecular mass distribution overall are generally obtained by this means. However, while the catalyst itself produces a narrow distribution in a single reactor, the polymer or copolymer obtained by a set of reactors in cascade will exhibit as many narrow distributions as reactors (bimodal, trimodal distribution, and so on), the said distributions exhibiting a small degree of overlap between them. Such a composition runs the risk of giving rise to demixing phenomena during the conversion. In addition, it is with difficulty that such a molecular mass distribution also has, at the same time, a low proportion of high molecular masses and a low proportion of low molecular masses.

It is desired, furthermore, that thermoplastic resins should contain as few catalyst residues as possible. A low catalyst residue content gives the resin better heat stability and makes it necessary to employ smaller quantities of antioxidants. For example, in the case of Ziegler catalysts based on $MgCl_2/TiCl_4$, attempts are made to ensure that the titanium content in the final resin is as low as possible, because this expresses a low content of catalyst residues, that is to say not only a low content of titanium, but also of magnesium and chlorine.

The process according to the invention involves a solid support. This support gives the particles of catalytic component their shape. Thus, if it is desired that the catalytic component should have a substantially spherical shape, a support which has a substantially spherical shape can be chosen.

The catalytic component according to the invention does impart its shape to the growing polymer or copolymer: a good morphological replication exists between the final polymer or copolymer and the catalytic component and therefore also the solid support employed. This good morphological replication ensues from the absence of bursting of the particles as they grow, and this is additionally reflected in a small ratio of fine particles in the final polymer or copolymer. The presence of fine particles is not desired because when they are being conveyed, for example during a gas-phase polymerization, they become more easily charged electrically and tend to agglomerate on the walls. Thus, if it is desired to obtain a polymer or copolymer exhibiting good pourability, it is desirable that the polymer or copolymer particles should be substantially spherical, and this is obtained more easily by starting with the catalytic component according to the invention, by virtue of the good morphological replication during the polymerization or copolymerization and provided that a substantially spherical support has been chosen for the production of the said catalytic component.

The catalytic component according to the invention produces, with a high output efficiency, a polymer or copolymer exhibiting a high Mw/Mn, a high Mz/Mw and a high Mz, as well as a low transition metal content, generally lower than 6 ppm.

One characteristic of the solid support according to the invention is that it is easily dehydrated in comparison with the solid supports as employed in the prior art: within the scope of the present invention the solid support has at its surface at least 5 hydroxyl groups per square nanometer ($OH/nm^2$).

Documents EP 32,308, EP 529,978 and EP 296,021 describe the use of highly dehydrated silica in the context of the preparation of a solid catalytic component.

For EP 127,530 the silica was dehydrated at more than 600° C. under nitrogen purging, and this provides a high dehydration of its surface.

Document EP 239,475 describes the preparation of a catalytic component on a $MgCl_2$ support (free from hydroxyl groups) by reaction of an organic chlorine compound, in the presence of an electron-donor and of a mixture of an alkylmagnesium and of an organic aluminium compound, the organic chlorine compound, used in combination with an electron-donor, being reacted in the preliminary mixture of alkylmagnesium compound, of aluminoxane and/or of aluminosiloxane, and optionally of electron-donor. This document recommends, in particular, carrying out two successive chlorination treatments.

The process according to the invention includes a first stage including bringing into contact a) a solid support including at its surface at least 5 hydroxyl groups per square nanometer ($OH/nm^2$) and b) an organic magnesium derivative, and optionally, preferably, c) an aluminoxane, to obtain a first solid, and then a second stage including bringing the first solid and a chlorinating agent into contact to obtain a second solid and then, in a later stage, impregnation of the second solid with a transition metal derivative.

The solid support includes at its surface preferably 6 to 19 hydroxyl groups per square nanometer. The solid support is preferably a porous metal oxide. The metal oxide may be silica, alumina, magnesia or a mixture of at least two of these oxides. The metal oxide support preferably includes pores of diameter ranging from 7.5 to 30 nm (75 to 300 Å). At least 10 k of its total pore volume preferably consists of pores of diameter ranging from 7.5 to 30 nm (75 to 300 Å). The porous metal oxide support preferably has a porosity ranging from 1 to 4 cm$^3$/g. The solid support preferably has a surface area ranging from 100 to 600 m$^2$/g.

There are many means which make it possible to attain the recommended content of hydroxyl groups per unit area.

These means can depend on the chemical nature of the support. These means also make it possible to free the surface from water, which is desired. A simple means making it possible to attain the desired surface quality before bringing into contact with the organic magnesium derivative consists in heating the support under purging with an inert gas such as nitrogen or argon. To speed up the dehydration it is possible to heat the solid support under vacuum. Investigation of the conditions for obtaining the content of hydroxyl groups per unit area is within the ability of a person skilled in the art using routine tests. When the support is made of silica the desired surface quality is generally obtained by heating between 70 and 200° C. and preferably between 80 and 180° C. under nitrogen purging at atmospheric pressure for 2 to 4 hours.

The support's hydroxyl group content per unit area can be determined according to known techniques such as, for example by reaction of an organomagnesium compound like CH$_3$MgI with the support, with measurement of the quantity of methane given off [McDaniel, J. Catal., 67, 71 (1981)], by reaction of triethylaluminium with the support, with measurement of the quantity of ethane given off [Thesis of Véronique Gaschard-Pasquet, University of Claude Bernard—Lyon 1, France, 1985, pages 221–224].

The organic magnesium derivative b) can, for example, be represented by the formula $R^1_a R^2_b MgX_{(2-a-b)}$ in which $R^1$ and $R^2$, which may be identical or different denote alkyl or alkoxy radicals containing from 1 to 12 carbon atoms, X denotes a halogen atom, preferably chlorine, a and b denote zero or one or two, at least one of a and b not being zero, and are such that $a+b \leq 2$.

To give an example, the organic magnesium derivative may be chosen from the following list: ethylmagnesium chloride, ethylmagnesium bromide, diethylmagnesium, di-n-butylmagnesium, di-isobutylmagnesium, di-n-hexylmagnesium, di-n-octylmagnesium and $(C_4H_9)_3Mg_2(C_2H_5)$.

The aluminoxane is a compound containing at least one aluminium-oxygen bond and containing organic radicals bonded to its aluminium atom(s).

For example, the aluminoxane may be chosen from the compounds of formula

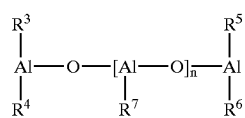

in which $R^3$, $R^4$, $R^5$, $R^6$ and $R^7$, which may be identical or different, denote alkyl radicals containing from 1 to 12 carbon atoms and preferably from 1 to 6 carbon atoms, and n is an integer ranging from 0 to 40 and preferably from 0 to 20 The radicals $R^4$ and $R^6$ may also together form a divalent radical consisting of an oxygen atom. Tetraisobutylaluminoxane and hexaisobutylaluminoxane may be mentioned as examples of aluminoxane.

The contact in the first stage may be brought about in the presence of a solvent which is inert towards the various ingredients a), b) and, where appropriate, c).

This solvent may, for example, be chosen from linear or branched aliphatic, alicyclic or aromatic hydrocarbons and may contain from 3 to 14 carbon atoms. As an example, propane, butane, pentane, hexane, heptane, octane, isododecane, cyclohexane, cyclopentane, decalin, toluene, xylene, benzene and ethylbenzene may be mentioned as solvent.

Depending on the nature of the solvent it may be necessary to perform the bringing into contact under pressure so that the solvent is indeed in liquid form.

The ingredients a) and b) may be introduced into the medium in which the contact is brought about so that the mass of magnesium originating from the organic magnesium derivative represents 0.1 to 14% by weight of the mass of solid support. In the preferred case where an aluminoxane is employed, the latter may be introduced so that the molar ratio of the magnesium originating from the organic magnesium derivative to the aluminium originating from the aluminoxane ranges from 0.5 to 200 and is preferably lower than 6.

The bringing into contact in the first stage must result in good impregnation of the solid support by the ingredient b) and, where appropriate, c). To improve this impregnation it is preferable, after the ingredients a), b) and, where appropriate, c) have been brought into contact, to evaporate, at least partially and optionally completely, the solvent employed for the said bringing into contact.

This evaporation may be carried out, for example, by purging with an inert gas like nitrogen or argon, optionally at a pressure which is lower than atmospheric pressure, between 50 and 100° C.

The order in which the ingredients a), b) and, where appropriate, c) and the solvent are brought into contact is of little importance. In general the procedure is as follows: the support is introduced into the solvent, and then b) and, where appropriate, c) are introduced into the mixture.

The contact in the first stage may, for example, be brought about at a temperature from ambient to 120° C.

The contact in the first stage produces a first solid.

In a second stage it is appropriate to bring this first solid into contact with a chlorinating agent. The chlorinating agent may be any compound capable of grafting chlorine onto the magnesium of the organic magnesium compound as a substitution for at least a proportion of the organic radicals of the latter, as well as on the aluminium of the aluminoxane as a substitution for at least a proportion of the organic radicals of the latter. The chlorinating agent may be chosen from alkyl chlorides in which the alkyl radical is primary, secondary or tertiary, from alkyl polyhalides or from acid chlorides. Chlorinating agents which may be mentioned are tert-butyl chloride, n-butyl chloride, dichloroethane, thionyl chloride, benzoyl chloride, hydrochloric acid, silicon tetrachloride, the chloride of a carboxylic acid, phosphorus chloride, boron chloride, phosgene and chlorine.

In the case of this second stage, called the chlorination stage, the number of moles of chlorine atoms contributed by the chlorinating agent is preferably at least equal to the number of moles of organic radicals bonded to the magnesium atoms of the organic magnesium derivative, to which is added, where appropriate, the number of moles of organic radicals bonded to the aluminium atoms of the aluminoxane. The chlorinating agent may be in an excess, for example, of 10 to 1000% relative to the quantity which has just been defined.

The contact in the second stage may be brought about in the presence of a solvent which is inert towards the reactants employed. One of the solvents already mentioned in the case of the contact in the first stage may be chosen as solvent. The chlorination contact may be brought about between 20 and 120° C. and preferably between 20 and 70° C.

This second stage produces a second solid.

This second solid can be isolated, but this is not indispensable. The stage of impregnation with the derivative of a transition metal can be carried out in the same environment as that employed for the chlorination stage, without it being necessary, for example, to wash the second solid or to remove the solvent employed for bringing about the contact in the second stage.

The transition metal derivative may be such that the transition metal is chosen from the elements of groups 3b, 4b, 5b, 6b, 7b and 8, the lanthanides and the actinides of the Periodic Classification of the Elements, as defined in the Handbook of Chemistry and Physics, 61st edition, 1980–1981. These transition metals are preferably chosen from titanium, vanadium, hafnium, zirconium and chromium. When the transition metal is titanium the titanium derivative may be chosen from the compounds of formula $Ti(OR)_xCl_{4-x}$ in which R denotes an aliphatic or aromatic hydrocarbon radical containing from one to fourteen carbon atoms, or denotes $COR^1$ with $R^1$ denoting an aliphatic or aromatic hydrocarbon radical of one to fourteen carbon atoms, and x denotes an integer ranging from 0 to 3. The transition metal derivative may, for example, be titanium tetrachloride.

The impregnation with the transition metal derivative can be carried out in the absence of solvent if the said derivative is liquid. However, it can also be carried out in the presence of a solvent. This solvent may be chosen from the same products already envisaged for the contacts in the first and second stages.

Several successive impregnations may be performed. Generally one or several impregnations are carried out in order that the final catalytic component should contain from 0.1 to 15% by weight of transition metal.

After impregnation the solid obtained is washed with one of the solvents already referred to, so as to remove the free halogen compounds, that is to say not bonded to the solid. A solid catalytic component for the polymerization or copolymerization of olefins has thus been obtained. This component may be dried by entrainment of the volatile species with a stream of inert gas such as nitrogen, optionally at reduced pressure, for example between 30 and 120° C.

The catalytic component can be used in polymerization or copolymerization of at least one olefin. Olefin is intended more particularly to mean those containing two to twenty carbon atoms and in particular the alpha-olefins of this group. Olefins which may be mentioned are ethylene, propylene, 1-butene, 4-methyl-1-pentene, 1-octene, 1-hexene, 3-methyl-1-pentene, 3-methyl-1-butene, 1-decene, 1-tetradecene or the mixtures of at least two of these olefins. The component according to the invention may be introduced into the suspension, gas phase, solution or bulk polymerization or copolymerization processes in the usual conditions for this kind of catalytic component. In the case where the intention is to obtain a polymer or copolymer which has a form substantially homothetical with that of the catalytic component, it is appropriate to choose a suspension or gas phase process.

A suspension polymerization or copolymerization process consists in carrying out a polymerization or copolymerization in an inert medium which does not dissolve or dissolves very little of the polymer or copolymer being formed. In the case of such a process, n-heptane, n-hexane, isohexane, isobutane or a mixture of heptane isomers may be chosen as inert medium, and the operation can be carried out at temperatures ranging up to 250° C. and at pressures ranging from the atmospheric pressure to 250 bar.

A gas phase polymerization process can be carried out with the aid of any reactor permitting a gas phase polymerization and in particular in a reactor with an agitated bed and/or a fluidized bed.

The conditions for carrying out the gas phase polymerization, especially temperature, pressure, injection of the olefin or of the olefins into the reactor with an agitated bed and/or fluidized bed, and control of the polymerization temperature and pressure, are similar to those proposed in the prior art for the gas phase polymerization of olefins. The operation is generally carried out at a temperature which is lower than the melting point Tm of the polymer or prepolymer to be synthesized, and which is more particularly between +20° C. and (Tm−5)° C., and at a pressure such that the olefin or the olefins are essentially in vapour phase.

Depending on the nature of the transition metal derivative, it may be necessary to introduce a cocatalyst capable of activating the said transition metal into the polymerization or copolymerization mixture. For example, when the transition metal derivative is titanium, the cocatalyst may be chosen from organic aluminium derivatives.

This organic aluminium derivative may be a derivative of formula $R^7R^8R^9Al$ in which each of $R^7$, $R^8$ and $R^9$, which may be identical or different, denotes either a hydrogen atom or a halogen atom, or an alkyl group containing from 1 to 20 carbon atoms, at least one of $R^7$, $R^8$ and $R^9$ denoting an alkyl group. Examples of suitable compounds which may be mentioned are ethylaluminium dichloride or dibromide or dihydride, isobutylaluminium dichloride or dibromide or dihydride, diethylaluminium chloride or bromide or hydride, di-n-propylaluminium chloride or bromide or hydride and diisobutylaluminium chloride or bromide or hydride. A trialkylaluminium such as tri-n-hexylaluminium, triisobutylaluminium, trimethylaluminium or triethylaluminium is employed in preference to the abovementioned compounds.

The cocatalyst may also be an aluminoxane. This aluminoxane may be linear, of formula

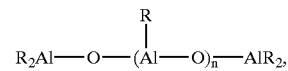

or cyclic of formula

R denoting an alkyl radical containing from one to six carbon atoms and n being an integer ranging from 0 to 40, preferably from 0 to 20. The aluminoxane may contain groups R of different kinds. The groups R preferably all denote methyl groups. Furthermore, cocatalyst is also intended to mean the mixtures of the abovementioned compounds.

The quantities of cocatalyst which are employed must be sufficient to activate the transition metal. Generally, when an organic aluminium derivative is employed as cocatalyst, a quantity thereof is introduced such that the atomic ratio of the aluminium contributed by the cocatalyst to the transition metal(s) which it is desired to activate ranges from 0.5 to 10,000 and preferably from 1 to 1000.

The polymerization or copolymerization may involve a chain transfer agent, so as to control the melt index of the polymer or copolymer to be produced. Hydrogen may be employed as chain transfer agent, which is introduced in a quantity that can range up to 90% and preferably lies between 0.01 and 60 mol % of the olefins and hydrogen combination delivered to the reactor.

In the case where an excellent morphological control of the particles is desired, it is recommended to carry out a prepolymerization at least partially in suspension on the particles of solid catalytic component, and then to introduce the prepolymer particles thus obtained into the suspension or gas phase polymerization or copolymerization process. The prepolymerization is performed up to a degree which is adapted to the polymerization process in which the prepolymer will be subsequently used.

The term prepolymer covers, of course, the copolymers obtained by copolymerization to a low degree of progress. The term prepolymerization therefore also covers a copolymerization to a low degree of progress.

The degree of prepolymerization is defined as being the weight of prepolymer, including the weight of solid catalytic component, divided by the weight of the solid catalytic component employed to obtain the mass of prepolymer being considered.

The degree of prepolymerization is higher than 1.05 and preferably such that the prepolymer formed represents at most 1% by weight of the final polymer. The degree of prepolymerization is generally lower than 100.

In the case where no aluminoxane has been introduced into the preparation of the solid catalytic component, a high degree of progress of prepolymerization is reflected in an increase in Mw/Mn, Mz/Mw and Mz of the final polymer or copolymer. This influence is much less sensitive when an aluminoxane is employed in the preparation of the solid catalytic component. In addition, when an aluminoxane has been employed, it may be enough to carry out a prepolymerization to a low degree of progress, for example of between 1.05 and 5 g/g without this having any appreciable consequence on the toughness of the growing particles. In this case the prepolymerization stage can therefore be very short.

In the case where it is desired to obtain a final polymer or copolymer exhibiting a relatively low Mz and a relatively high melt index at 190° C. under 5 kg (denoted by $MI_5$, ASTM standard D 1238-P), and in the case where the transition metal of the solid catalytic component is titanium and the cocatalyst employed during the prepolymerization is an organic aluminium derivative, it is appropriate to increase the Al/Ti molar ratio of the aluminium contributed by the cocatalyst during the prepolymerization to the titanium present in the solid catalytic component. From this point of view the Al/Ti molar ratio could be between 1.5 and 10 and preferably between 1.5 and 3.

In a preferred method of prepolymerization in suspension, with agitation in a turbulent regime, prepolymerization is carried out at a temperature of between 0° C. and 110° C., preferably between 20° C. and 60° C., in the case of a total pressure lower than 20 bar absolute, consisting essentially of inert gas such as nitrogen. In order to preserve the initial morphology of the catalytic component and of its support as much as possible, it is recommended to control the monomer feed into the reactor. The control of morphology of the growing prepolymer particles is particularly tricky in the case of the catalysts on support. The stresses developed during the processes of synthesis of these supports are only ready to be released under the effect of the prepolymerization, running the risk of entailing the fragmentation of the growing particles. This fragmentation can be avoided during the prepolymerization by maintaining a feed rate in the initial hour of prepolymerization which is lower than or equal to 0.5 $mol \times h^{-1} \times g^{-1}$ of catalytic component. The monomer flow rate is subsequently increased so that it remains lower than or equal to 5 $mol \times h^{-1} \times g^{-1}$ of prepolymer present in the reactor at the moment being considered.

When the prepolymer is intended for a gas phase polymerization or copolymerization process, the prepolymerization in suspension may be performed in the conditions which have just been given to a lower degree of progress of prepolymerization, for example lower than 5 g of polymer or copolymer per gram of catalytic component, the prepolymer may be isolated and may then be taken up into a gas phase prepolymerization system so as to change from the lower degree of progress of prepolymerization to the degree of prepolymerization suited to the subsequent polymerization process.

Apart from the several special features which have just been given, the prepolymerization in suspension is performed in the same conditions as those described above, in general, in the case of a suspension polymerization or copolymerization.

The optional part of gas phase prepolymerization is performed in the conditions which are usual in the gas phase polymerization or copolymerization process. It is possible, for example, to use the prepolymer with a low degree of progress, in a reactor, in combination with a polyolefin charge of mean particle size smaller than or equal to 3000 and preferably smaller than or equal to 1000 μm. After homogenization the prepolymerization is continued by introducing monomer at a controlled flow rate so as to avoid the bursting and the formation of aggregate. The gas phase prepolymerization is preferably carried out at a temperature of between 40 and 80° C. at a total pressure, of monomer and of inert gas, lower than or equal to 20 bar. This gas phase prepolymerization is continued until a degree of prepolymerization is obtained which is suited to the subsequent polymerization process. However, it is recommended that this degree of prepolymerization should be such that the prepolymer formed represents at most 1% by weight of the final polymer. In order to preserve the initial morphology of the catalytic component and of its support as much as possible, it is recommended to control the monomer feed into the reactor. A feed rate which is favourable for the first hour is lower than or equal to 0.5 $mol \times h^{-1} \times g^{-1}$ of the catalytic component. The monomer flow rate may be increased so that it remains lower than or equal to 5 $mol \times h^{-1} \times g^{-1}$ of prepolymer present in the reactor at the moment being considered.

When hydrogen is employed as chain transfer agent during the prepolymerization(s), and when the catalytic component has been prepared without aluminoxane (compound c)), it is preferable that the quantity of hydrogen should be lower than 15% and, still more preferably, lower than 10 mol % of the hydrogen/olefin combination delivered to the prepolymerization reactor. Surprisingly, it has been found, in fact, that in these conditions the final polymer or copolymer had a higher Mw/Mn, Mz/Mw and Mz.

Preferably, no electron-donor is introduced either at the preparation of the first solid or at that of the second solid, or at that of the catalyst component or at that of its use in prepolymerization and/or polymerization. In the literature the electron-donor is generally chosen from aliphatic or aromatic carboxylic acids and their alkyl esters, aliphatic or cyclic ethers, ketones, vinyl esters, acrylic derivatives, in particular alkyl acrylates or alkyl methacrylates and silanes such as aromatic, alicyclic or aliphatic alkoxysilanes. Electron-donors which are usually cited in the literature are the compounds such as methyl para-toluate, ethyl benzoate, ethyl or butyl acetate, ethyl ether, ethyl para-anisate, dibutyl phthalate, dioctyl phthalate, diisobutyl phthalate., tetrahydrofuran, dioxane, acetone, methyl isobutyl ketone, vinyl acetate, methyl methacrylate, phenyltriethoxysilane, cyclohexylmethyldimethoxysilane, dicyclopentyldimethoxysilane and one of those mentioned in patent application EP 0,361,493.

As the examples show, copolymers of ethylene and of an alpha-olefin containing from 3 to 12 carbon atoms, and in which 0.1 to 1.5 mol % of the units originate from the alpha-olefin, and having a relative density ranging from 0.960 to 0.940, a content of transition metal like titanium lower than 6 ppm and even lower than 5 ppm, an Mw/Mn higher than 7, an Mz/Mw higher than 3.3 and an Mz higher than 300,000 can be obtained.

Such copolymers find in particular an application in blow extrusion for the manufacture of hollow bodies.

The larger the volume of the hollow body, the higher the values sought after for Mw/Mn, Mz/Mw and Mz. The copolymers which have just been considered may even have an Mw/Mn higher than 10 if an aluminoxane is employed in the preparation of the solid catalytic component, the molar ratio of the magnesium contributed by the organic magnesium derivative to the aluminium contributed by the aluminoxane being lower than 6.

The use of reactors in cascade makes it even possible to obtain such copolymers exhibiting an Mw/Mn>13, an Mz/Mw>5 and an Mz>600,000.

Copolymers which have a relative density ranging from 0.915 to 0.930 can also be obtained provided that ethylene is copolymerized with an alpha-olefin, the alpha-olefin representing 2 to 6 mol % of the ethylene/alpha-olefin combination delivered to the reactor. Mw/Mn values higher than 13 can be obtained provided that reactors in cascade are employed.

At least two reactors may be mounted in cascade if it is particularly desired to broaden the molecular mass distribution of the final polymer or copolymer. Of course, this broadening effect is obtained only if the reactors function differently and in particular affect the transfer reactions in an appreciably different manner. It is possible, for example, to make one of the reactors operate so that it promotes the transfer reactions, whereas another reactor is unfavourable to the transfer reactions. If the transfer reactions are favoured, the molecular masses are lowered, and if the transfer reactions are made unfavourable, the molecular masses are increased. A person skilled in the art knows how to promote the transfer reactions or how to make them unfavourable during a polymerization or copolymerization. In particular, he or she knows that it is possible to modify the hydrogen content of the mixture, the content of alpha-olefin as comonomer in the mixture, and the temperature.

The techniques employed in the examples are given below:
Mw, Mn, Mz: gel permeation chromatography.
Dp50 (particle diameter below which 50% by weight of the particles is to be found):
  ☐ polymer or copolymer: screening,
  solid catalytic component:
    laser particle size analyser of Malvern 1600 type.
Percentage of the polymer or copolymer particles which have a diameter smaller than 100 μm (denoted by "%<100 μm" in Table 1): screening.
Density of the polymers or copolymers: ISO standard 11–83 (denoted by D in Table 1)
Concentration per unit area of hydroxyl groups on the support: reaction of triethylaluminium and monitoring of the release of ethane (thesis of V. Gaschard-Pasquet, University of Claude-Bernard-LYON 1, France, 1985, pages 221–224).

The following abbreviations have been employed in the examples and in particular in the tables:
4-M-1-P: 4-methyl-1-pentene
dpp: degree of progress of prepolymerization
1-HEX: 1-hexene
Ti (ppm): titanium content of the final polymer or copolymer
$MI_5$: melt index under 5 kg at 190° C. (ASTM standard D1238-P)
Al/Ti: molar ratio of the quantity of aluminium contributed by the cocatalyst to the prepolymerization to the quantity of titanium in the solid catalytic component.

EXAMPLE 1

Synthesis of a Solid Catalytic Component a) 15 g of Grace 948 silica are dried in an oven under nitrogen atmosphere at 100° C. under a partial vacuum of 20 mbar for 15 h. This silica contains 8 residual silanol (SiOH) functional groups per $nm^2$.

b) In a 0.5-l cylindrical reactor fitted with a jacket and a nonshearing mechanical stirring are placed 10 g of the silica dried at 110° C. and then 25 millimol of butylethylmagnesium in solution at a concentration of 20% by weight in heptane are added dropwise over ½ h with slow stirring of the dry solid. The stirring is continued ½ h and the mixture is then heated to 60° C. under purging with dry nitrogen until a dry powder is obtained (approximately ½ h). 160 ml of dry hexane are added at ambient temperature and then bubbling of dry gaseous hydrochloric acid into the suspension is performed for 1 h (approximately 400 millimol of HCl). The hydrochloric acid is employed in large excess and at the end of chlorination the suspension is strongly acidic. Finally, 0.65 ml of pure $TiCl_4$ is added in one lot and the suspension is then kept stirred at 55° C. for one hour.

The solid catalyst is filtered off, washed with 3 times 60 ml of hexane and then dried under a stream of nitrogen at 55° C. for 1 h. 12 g of dry solid catalytic component are isolated, which product has the following characteristics: Ti=2.2 weight %, Mg=4.1 weight %, Dp50=48 μm.

EXAMPLE 2

Synthesis of a Solid Catalytic Component

Example 1 is reproduced entirely except that in stage a) the Grace 948 silica is fluidized with a stream of nitrogen at 800° C. for 8 h. This silica contains 1.5 residual silanol functional groups per $nm^2$. 10 g of this silica are subsequently used in stage b).

12.8 g of dry solid catalytic component are finally isolated, which product has the following characteristics: Ti=2.5 weight %, Mg=4.1 weight %, Dp50=47 μm.

EXAMPLE 3

Synthesis of a Solid Catalytic Component

Example 1 is reproduced entirely except that in stage a) the Grace 948 silica is heat-treated at 110° C. as in Example 1 and is then treated with hexamethyldisilazane in the following conditions: 5 g of hexamethyldisilazane are added under inert atmosphere to a suspension in 120 ml of hexane of 20 g of silica dried at 110° C. as in Example 1. The suspension is left for 15 days under slow stirring at 25° C. The solid obtained is filtered off and then washed with 3 times 100 ml of hexane. It no longer contains any measurable silanol functional group.

EXAMPLES 4, 5, 6

Prepolymerization

The solid catalytic components of Examples 1, 2 and 3 form the subject of a prepolymerization (Example 4, Example 5, Example 6 respectively) in the following conditions.

400 ml of hexane, 0.7 ml of pure trihexylaluminium (THA) and 4 g of solid catalytic component are placed under inert atmosphere in a 1-liter jacketed reactor. The reactor is then pressurized with 1 bar of hydrogen and then fed continuously with gaseous ethylene at a flow rate of 15 ml/h up to a cumulative flow rate corresponding to an ethylene consumption of 10 g of ethylene per gram of solid catalytic component and then at a flow rate of 25 ml/h up to a cumulative flow rate corresponding to an ethylene consumption of 24 g of ethylene per gram of solid catalytic component.

Prepolymers are obtained which have a degree of progress of 25 g of prepolymer per g of solid catalytic component.

EXAMPLES 7, 8, 9

Gas Phase Polymerization

The prepolymers prepared according to Examples 4, 5 and 6 are used in gas phase homopolymerization of ethylene in the following conditions. Into a dry 8-liter jacketed reactor fitted with stirring and temperature control are introduced, under nitrogen atmosphere at 90° C. with stirring at 400 revolutions per minute, 100 grams of a dry polyethylene powder originating from a polymerization which is identical with that described at present and 0.5 millimol of THA and the reactor is then pressurized with 2 bar of nitrogen, 4 bar of hydrogen and 8 bar of ethylene. 6 grams of prepolymer are next introduced by means of a gas lock and by driving with nitrogen and the nitrogen injection is continued until a pressure of 21 bar is obtained in the reactor. The pressure is maintained at this value by continuous injection of ethylene. After 4 hours' reaction the polymerization is stopped by stopping the ethylene feed and the reactor is decompressed, purged with nitrogen and cooled. The polymer is recovered. The output efficiencies and the characteristics of the powder are given in Table 1.

EXAMPLE 10

Prepolymerization

Into a 1-l cylindrical reactor fitted with a jacket and a stirring system are introduced at ambient temperature under nitrogen atmosphere 0.6 l of hexane, 6 mM of THA and 12.6 g of solid catalytic component prepared in the conditions of Example 1.

The temperature of the mixture is raised to 65° C. and the reactor is fed with 6.4 g of ethylene for 24 min.

The solvent is then evaporated off by entrainment with nitrogen at 65° C. and, after return to ambient temperature, 19 g of prepolymer are recovered, with a degree of progress of 1.5 g of prepolymer/g of solid catalytic component.

EXAMPLE 11

Prepolymerization

Into a 2.5-l stainless steel reactor fitted with a jacket and a stirring system are introduced at ambient temperature 0.6 l of hexane, 8.4 mmol of THA and 14.6 g of solid catalytic component prepared in the conditions of Example 1. The temperature of the mixture is raised to 65° C. and the reactor is fed with an $H_2/C_2H_4$ mixture with an $H_2/C_2H_4$ molar ratio of 0.01 up to a cumulative flow of 350 g of $C_2H_4$ over 4 h 30 min.

The solvent is then evaporated off at 65° C. by entrainment with nitrogen, cooling is performed and 28 mmol of THA are added with stirring. 365 g of prepolymer are recovered under nitrogen, with a degree of progress of 25 g of prepolymer/g of solid catalytic component.

EXAMPLE 12

Prepolymerization

The operation is carried out as in Example 10, except that the reactor is fed with an $H_2/C_2H_4$ mixture with an $H_2/C_2H_4$ molar ratio of 0.12 and that the cumulative flow of $C_2H_4$ is 12.6 g. 25 g of prepolymer are recovered, with a degree of progress of 2 g of prepolymer/g of solid catalytic component.

EXAMPLES 13 TO 16

Gas Phase Ethylene/1-Hexene Copolymerization

The solid catalytic components or prepolymers prepared according to Example 1, 10, 11 and 12 respectively are used in ethylene/1-hexene copolymerization in the following conditions.

Into an 8.2-liter stainless steel reactor equipped with heat control using a jacket and with a stirring system are introduced at 86° C. after purging with nitrogen and with stirring at 400 revolutions per minute:

100 g of ethylene 1-hexene copolymer originating from a preceding identical test, 0.73 mmol of pure THA, 0.2 bar of 1-hexene, 2.9 bar of $H_2$, 9.25 bar of $C_2H_4$.

Next, x g of solid catalytic component or prepolymer prepared according to Examples 1, 10, 11 and 12 (x=0.2 g, 0.25 g, 5 g and 0.43 g respectively) are introduced by propelling with nitrogen until the total pressure inside the reactor reaches 21 bar absolute. The pressure is maintained at this value by addition of a 1-hexene/ethylene mixture with a 1-hexene/ethylene molar ratio of 0.01 for four hours and the reactor is then decompressed and cooled. An ethylene/1-hexene copolymer is recovered with an output efficiency and properties which are given in Table 1.

EXAMPLE 17

Synthesis of a Solid Catalytic Component

The operation is carried out as in Example 1, except that after having introduced butylethylmagnesium 1.7 millimol of tetraisobutylaluminoxane are introduced. 12.1 g of dry solid catalytic component are isolated, which have the following characteristics: Ti=2.1 by weight, Mg=4% by weight, Al=0.61% by weight, Dp50=48.5.

EXAMPLE 18

Synthesis of a Solid Catalytic Component

The operation is carried out as in Example 17, except that 0.85 mmol of tetraisobutylaluminoxane are introduced instead of 1.7 mmol. 12.1 g of dry solid catalytic component are isolated, which have the following characteristics: Ti=2.4 weight %, Mg=4 weight %, Al=0.25 weight %, Dp50=48.4.

EXAMPLE 19

Prepolymerization

The operation is carried out as in Example 10, except that the catalyst injected is obtained according to Example 18 and that an $H_2/C_2H_4$=0.01 molar mixture is introduced, the quantity of ethylene remaining the same as in Example 10. 19 g of prepolymer are recovered, with a degree of progress of 1.5 g of prepolymer/g of solid catalytic component.

EXAMPLE 20

Prepolymerization

The operation is carried out as in Example 11, except that the solid catalytic component introduced is obtained according to Example 17. A prepolymer is recovered with a degree of progress of 25 g of prepolymer/g of solid catalytic component.

EXAMPLE 21

Prepolymerization

The operation is carried out as in Example 10, except that the solid catalytic component employed is obtained according to Example 17 and that the ethylene is replaced with 6.4 g of 4-methyl-1-pentene. 19 g of prepolymer are obtained, with a degree of progress of 1.5 g of prepolymer per g of solid catalytic component.

EXAMPLES 22 TO 25

Gas Phase Ethylene/1-Hexene Copolymerization

The solid catalytic components or prepolymers prepared according to Examples 17, 19, 20 and 21 are used in ethylene/1-hexene copolymerization in the following conditions:

Into an 8.2-liter stainless steel reactor equipped with heat control using a jacket and with a stirring system are introduced at 86° C. after purging with nitrogen and with stirring at 400 revolutions per minute:

100 g of ethylene/1-hexene copolymer originating from a preceding identical test,
0.73 mmol of pure THA,
0.2 bar of 1-hexene,
2.9 bar of $H_2$,
9.25 bar of $C_2H_4$.

Next, x g of solid catalytic component or prepolymer prepared according to Examples 1, 10, 11 and 12 (x=0.15 g, 0.25 g, 3 g and 0.25 g respectively) are introduced by propelling with nitrogen until the total pressure inside the reactor reaches 21 bar absolute. The pressure is maintained at this value by addition of a 1-hexene/ethylene mixture with a 1-hexene/ethylene molar ratio of 0.01 for four hours, and the reactor is then decompressed and cooled. An ethylene/1-hexene copolymer is recovered with an output efficiency and the properties given in Table 1.

EXAMPLE 26

Prepolymerization

The operation is carried out as in Example 19, except that the solid catalytic component employed is obtained according to Example 17. 19 g of prepolymer are recovered, with a degree of progress of 1.5 g of prepolymer/g of solid catalytic component.

EXAMPLE 27

Gas Phase Ethylene/1-Hexene Copolymerization in Cascade

The prepolymer prepared according to Example 26 is used in ethylene/1-hexene copolymerization in the following conditions:

Into an 8.2-liter reactor equipped with heat control using a jacket and with a stirring system are introduced at 86° C. after purging with nitrogen and with stirring at 400 revolutions per minute:

100 g of ethylene/1-hexene copolymer originating from a preceding identical test,
0.73 mmol of pure THA,
0.2 bar of 1-hexene,
0.5 bar of $H_2$,
9.25 bar of $C_2H_4$.

Next, 0.2 g of prepolymer prepared according to Example 26 are introduced by propelling with nitrogen until the total pressure inside the reactor reaches 21 bar absolute. The pressure is maintained at this value by addition of a 1-hexene/ethylene mixture with a 1-hexene/ethylene molar ratio of 0.01, for 1 h 45 min. The reactor is then decompressed and purged with nitrogen.

A gas phase is reconstituted by introduction of:
0.2 bar of 1-hexene,
5 bar of $H_2$,
9.25 bar of $C_2H_4$,
the remainder of nitrogen to reach 21 bar absolute.

The pressure is maintained at this value by addition of a 1-hexene/ethylene mixture with a 1-hexene/ethylene molar ratio of 0.01 for 2 h 35 min.

An ethylene/1-hexene copolymer is recovered with an output efficiency and the properties given in Table 1.

EXAMPLE 28

Prepolymerization

The procedure is as in Example 10, except that 13.5 mmol of THA are introduced instead of the 6 mmol of THA, and except that the solid catalytic component is that obtained using Example 17. 39 g of prepolymer are thus obtained, the degree of progress of which is 3.1 g/g.

EXAMPLE 29

Prepolymerization

The procedure is as in Example 28, except that the solid catalytic component is that obtained using Example 18. 43 g of prepolymer are thus obtained, the degree of progress of which is 3.4 g/g.

EXAMPLE 30

Prepolymerization

The procedure is as in Example 28, except that 3 mmol of THA are introduced instead of the 13.5 mmol of THA. 44 g of prepolymer are thus obtained, the degree of progress of which is 3.5 g/g.

EXAMPLES 31 TO 33

Gas Phase Ethylene/1-Hexene Copolymerization

The procedure is as in Examples 13 to 16, except that the prepolymers of Examples 28, 29 and 30 respectively are introduced instead of the solid catalytic components.

The results are collated in Table 2.

EXAMPLE 34

Gas Phase Ethylene/1-Hexene Copolymerization in Cascade

The prepolymer prepared according to Example 29 is used in ethylene/1-hexene copolymerization in the following conditions:

Into an 8.2-liter reactor equipped with heat control using a jacket and with a stirring system are introduced at 86° C. after purging with nitrogen and with stirring at 400 revolutions per minute:

100 g of ethylene/1-hexene copolymer originating from a preceding identical test, 1.1 mmol of pure THA, 0.2 bar of 1-hexene, 9 bar of $H_2$, 9.25 bar of $C_2H_4$.

Next, 0.5 g of prepolymer prepared according to Example 29 are introduced by propelling with nitrogen until the total pressure inside the reactor reaches 21 bar absolute. The pressure is maintained at this value by addition of a 1-hexene/ethylene mixture with a 1-hexene/ethylene molar ratio of 0.01, for 130 minutes. The reactor is then decompressed and purged with nitrogen.

A gas phase is reconstituted by introduction of:

0.2 bar of 1-hexene, 0.1 bar of $H_2$, 9.25 bar of $C_2H_4$, the remainder of nitrogen to reach 21 bar absolute.

The pressure is maintained at this value by addition of a 1-hexene/ethylene mixture with a 1-hexene/ethylene molar ratio of 0.01 for 62 min.

An ethylene/1-hexene copolymer is recovered with an output efficiency and the properties given in Table 2.

TABLE 1

| Ex. No. | SOLID COMPONENT According to Ex. No. | PREPOLYMERIZATION Mg/Al (molar) | Monomers | dpp (g/g) | H2/C$_2$H$_4$ (molar) | POLYMERIZATION Monomers | Output efficiency g/g | Dp 50 (μm) | % < 100 (μm) | Mw/Mn | Mz/Mw | Mz | D | Ti (ppm) |
|---|---|---|---|---|---|---|---|---|---|---|---|---|---|---|
| 7 | 1 | — | C$_2$H$_4$ | 25 | | C$_2$H$_4$ | 3 900 | 681 | 0 | 9.8 | 5.9 | 619 200 | 0.960 | 5.6 |
| 8 (comp) | 2 | — | C$_2$H$_4$ | 25 | | C$_2$H$_4$ | 6 000 | 730 | 0.22 | 8.2 | 5.3 | 470 000 | 0.961 | 3.6 |
| 9 (comp) | 3 | — | C$_2$H$_4$ | 25 | | C$_2$H$_4$ | 5 400 | 750 | 0.23 | 7.3 | 4.6 | 346 000 | 0.960 | 4 |
| 13 | 1 | — | — | — | — | C$_2$H$_4$/1-HEX | 5 475 | 473 | 0.18 | 7.93 | 3.58 | 362 800 | 0.948 | 4 |
| 14 | 1 | — | C$_2$H$_4$ | 1.5 | 0 | C$_2$H$_4$/1-HEX | 5 475 | 945 | 0 | 9.11 | 3.93 | 386 400 | 0.950 | 4 |
| 15 | 1 | — | C$_2$H$_4$ | 25 | 0.01 | C$_2$H$_4$/1-HEX | 4 735 | 792 | 0.09 | 11 | 4.01 | 444 700 | 0.951 | 4.6 |
| 16 | 1 | — | C$_2$H$_4$ | 2 | 0.12 | C$_2$H$_4$/1-HEX | 4 000 | 834 | 0.08 | 8.29 | 3.5 | 324 800 | 0.948 | 5.3 |
| 22 | 17 | 3.5 | — | — | — | C$_2$H$_4$/1-HEX | 4 100 | 330 | 2.43 | 11.1 | 4.52 | 503 700 | 0.948 | 5.1 |
| 23 | 18 | 7.4 | C$_2$H$_4$ | 1.5 | 0.01 | C$_2$H$_4$/1-HEX | 6 180 | 630 | 0.07 | 8.3 | 3.98 | 434 300 | 0.95 | 3.4 |
| 24 | 17 | 3.5 | C$_2$H$_4$ | 25 | 0.01 | C$_2$H$_4$/1-HEX | 4 970 | 694 | 0.09 | 12 | 6.24 | 697 800 | 0.949 | 4.2 |
| 25 | 17 | 3.5 | 4-M-1-P | 1.5 | 0 | C$_2$H$_4$/1-HEX | 6 210 | 537 | 0.1 | 11 | 3.89 | 417 800 | 0.951 | 3.4 |
| 27 | 17 | 3.5 | C$_2$H$_4$ | 1.5 | 0.01 | C$_2$H$_4$/1-HEX | 4 000 | 741 | 1.44 | 17 | 6.5 | 720 000 | 0.950 | 5.2 |

TABLE 2

| Ex. No. | SOLID COMPONENT | | | POLYMERIZATION | | | | | | |
|---|---|---|---|---|---|---|---|---|---|---|
| | According to Ex. No. | Mg/Al (molar) | PREPOLYMERIZATION Al/Ti | Output efficiency g/g | Mw/Mn | Mz/Mw | Mz | D | MI$_5$ |
| 31 | 17 | 3.5 | 2.3 | 8 800 | 9 | 4.25 | 386 900 | 0.951 | 11 |
| 32 | 18 | 7.4 | 2.06 | 7 700 | 8.7 | 4.7 | 457 300 | 0.949 | 9.3 |
| 33 | 17 | 3.5 | 0.52 | 6 100 | 6.9 | 4.1 | 488 400 | 0.950 | 3.4 |
| 34 | 18 | 7.4 | 2.06 | 6 310 | 37.8 | 5.46 | 715 300 | 0.946 | 3.1 |

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

What is claimed is:

1. A copolymer of ethylene and of an alpha-olefin containing from 3 to 12 carbon atoms, in which 0.1 to 1.5 mol % of the units originate from the alpha-olefin, which has a relative density ranging from 0.960 to 0.940, a transition metal content lower than 6 ppm, an Mw/Mn higher than 7, an Mz/Mw higher than 3.3 and an Mz higher than 300,000.

2. The copolymer according to claim 1, wherein the Mw/Mn is higher than 13, the Mz/Mw is higher than 5 and the Mz is higher than 600,000.

3. The copolymer according to claim 1, wherein the transition metal content is lower than 5 ppm.

* * * * *